US 9,515,714 B2

(12) United States Patent
Jeong et al.

(10) Patent No.: US 9,515,714 B2
(45) Date of Patent: Dec. 6, 2016

(54) APPARATUS AND METHOD FOR TRANSMITTING AND RECEIVING FEEDBACK INFORMATION IN BEAMFORMING COMMUNICATION SYSTEM

(71) Applicant: Samsung Electronics Co., Ltd., Gyeonggi-do (KR)

(72) Inventors: Su-Ryong Jeong, Gyeonggi-do (KR); Jeong-Ho Park, Seoul (KR); Tae-Young Kim, Gyeonggi-do (KR); Ji-Yun Seol, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 14/260,138

(22) Filed: Apr. 23, 2014

(65) Prior Publication Data

US 2014/0314167 A1 Oct. 23, 2014

(30) Foreign Application Priority Data

Apr. 23, 2013 (KR) .......... 10-2013-0044880

(51) Int. Cl.
*H04M 1/00* (2006.01)
*H04B 7/06* (2006.01)

(52) U.S. Cl.
CPC .......... *H04B 7/0626* (2013.01); *H04B 7/0617* (2013.01); *H04B 7/0695* (2013.01)

(58) Field of Classification Search
USPC ........ 455/522, 69–70, 500–516, 63.1, 67.11, 455/67.13; 370/310–315
See application file for complete search history.

(56) References Cited

U.S. PATENT DOCUMENTS

| | | | |
|---|---|---|---|
| 2002/0150065 A1* | 10/2002 | Ponnekanti | H04B 7/0617 370/334 |
| 2007/0290870 A1 | 12/2007 | Normand | |
| 2007/0291870 A1* | 12/2007 | Ponnekanti | H04B 7/0617 375/295 |
| 2008/0267063 A1 | 10/2008 | Trigui et al. | |
| 2010/0029222 A1 | 2/2010 | Doubchak et al. | |

FOREIGN PATENT DOCUMENTS

| | | |
|---|---|---|
| JP | 3926561 B2 | 6/2007 |
| KR | 10-2010-0082405 A | 7/2010 |
| KR | 10-2014-0016854 | 2/2014 |

OTHER PUBLICATIONS

International Search Report dated Aug. 7, 2014 in connection with International Patent Application No. PCT/KR2014/0035246; 4 pages.
Written Opinion of International Searching Authority dated Aug. 7, 2014 in connection with International Patent Application No. PCT/KR2014/0035246; 6 pages.

* cited by examiner

*Primary Examiner* — Fayyaz Alam

(57) ABSTRACT

A method for operating a mobile station in a mobile communication system. The method includes: receiving a plurality of transmit (Tx) beam signals from a base station; generating indication information for indicating a difference in arrival time between effective Tx beam signals selected from the received Tx beam signals; and transmitting feedback information including the indication information to the base station.

36 Claims, 17 Drawing Sheets

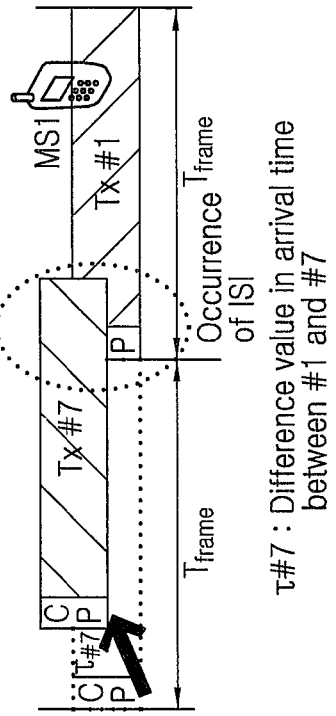
FIG.3B
FIG.3C
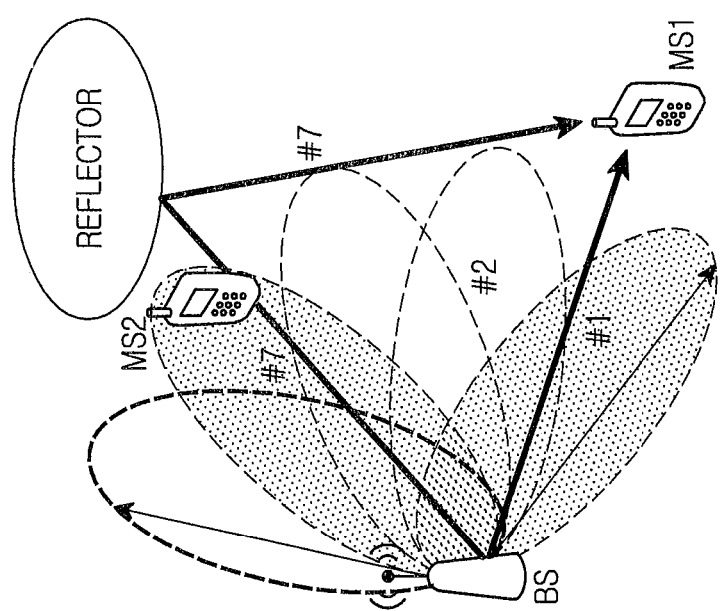
FIG.3A

| CQI 1 : | | | CQI 2 : | | | CQI 3 : | | | CQI 4 : | | |
|---|---|---|---|---|---|---|---|---|---|---|---|
| TxB #1 | CQI :Q1 | Flag 0 | TxB #2 | CQI :Q2 | Flag 0 | TxB #3 | CQI :Q3 | Flag 0 | TxB #4 | CQI :Q4 | Flag 1 |
| 11 | 12 | 13 | 21 | 22 | 23 | 31 | 32 | 33 | 41 | 42 | 43 |

CASE 1 : HYBRID-BF CANDIDATE TX BEAM

FIG.6A

| CQI 1 : | | | CQI 2 : | | | CQI 3 : | | | CQI 4 : | | |
|---|---|---|---|---|---|---|---|---|---|---|---|
| TxB #1 | CQI :Q1 | Flag 1 | TxB #2 | CQI :Q2 | Flag 0 | TxB #3 | CQI :Q3 | Flag 0 | TxB #4 | CQI :Q4 | Flag 0 |
| 11 | 12 | 13 | 21 | 22 | 23 | 31 | 32 | 33 | 41 | 42 | 43 |

CASE 2 : HYBRID-BF CANDIDATE TX BEAM

FIG.6B

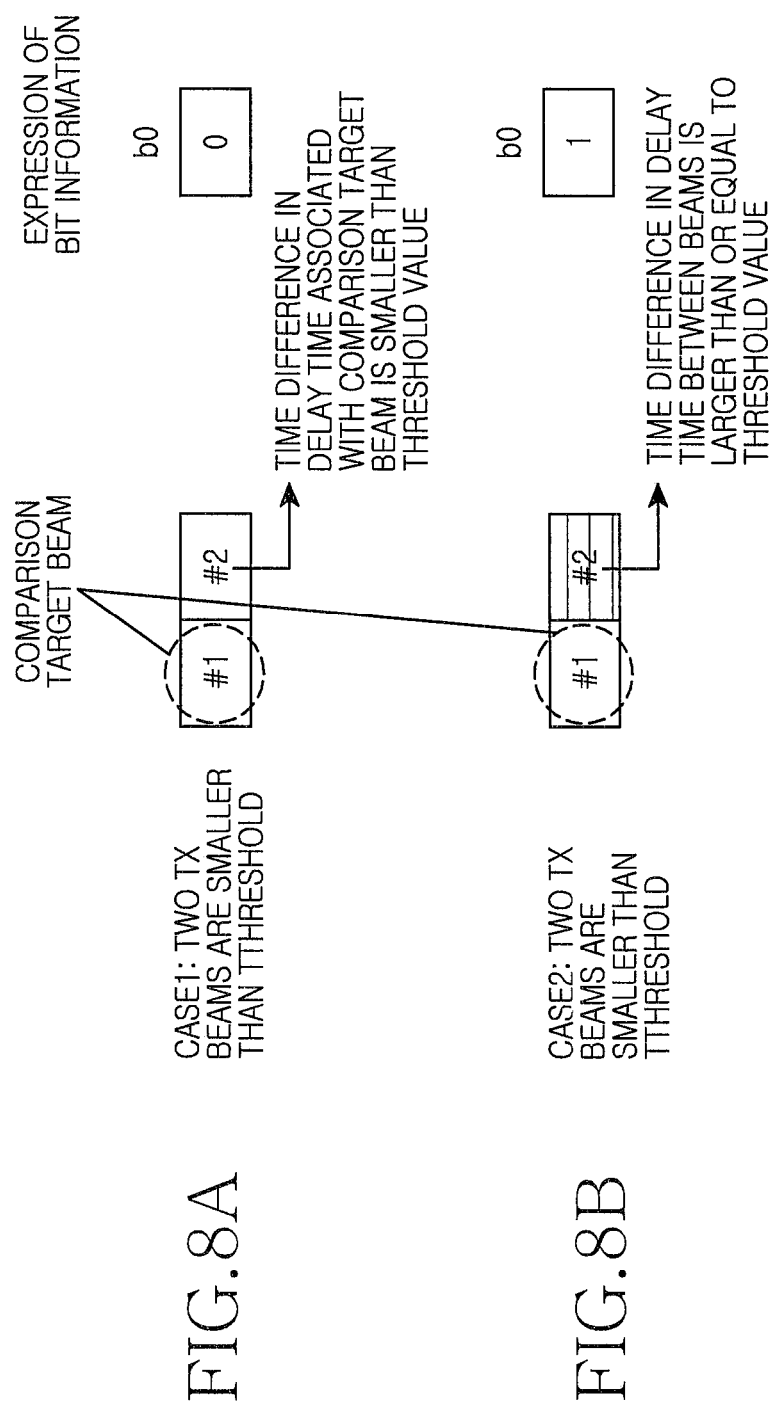

EXPRESSION OF
BIT INFORMATION

EXPRESSION OF BIT INFORMATION

FIG.10A  Case 1: b0=0, b1=0, b2=0

FIG.10B  Case 2: b0=0, b1=0, b2=1

FIG.10C  Case 3: b0=0, b1=1, b2=0

FIG.10D  Case 4: b0=0, b1=1, b2=1

FIG.10E  Case 5: b0=1, b1=0, b2=0

FIG.10F  Case 6: b0=1, b1=0, b2=1

FIG.10G  Case 7: b0=1, b1=1, b2=0

FIG.10H  Case 8: b0=1, b1=1, b2=1

FIG.11A — FIG.11P: Expression of bit information (b0 b1 b2 b3), Cases 1–16.

- FIG.11A, Case1: 0 0 0 0
- FIG.11B, Case2: 0 0 0 1
- FIG.11C, Case3: 0 0 1 0
- FIG.11D, Case4: 0 0 1 1
- FIG.11E, Case5: 0 1 0 0
- FIG.11F, Case6: 0 1 0 1
- FIG.11G, Case7: 0 1 1 0
- FIG.11H, Case8: 0 1 1 1
- FIG.11I, Case9: 1 0 0 0
- FIG.11J, Case10: 1 0 0 1
- FIG.11K, Case11: 1 0 1 0
- FIG.11L, Case12: 1 0 1 1
- FIG.11M, Case13: 1 1 0 0
- FIG.11N, Case14: 1 1 0 1
- FIG.11O, Case15: 1 1 1 0
- FIG.11P, Case16: 1 1 1 1

APPARATUS AND METHOD FOR TRANSMITTING AND RECEIVING FEEDBACK INFORMATION IN BEAMFORMING COMMUNICATION SYSTEM

PRIORITY

The present application is related to and claims priority under 35 U.S.C. §119 to an application filed in the Korean Intellectual Property Office on Apr. 23, 2013 and assigned Serial No. 10-2013-0044880, the contents of which are incorporated herein by reference.

TECHNICAL FIELD

The present disclosure relates generally to a beamforming-based mobile communication system, and in particular, to a method and apparatus for transmitting and receiving feedback information.

BACKGROUND

Recently, research on beamforming technology has been conducted intensively as an important technique for improving signal quality by reducing loss in propagation paths and acquiring high signal to interference and noise ratio (SINR) in mobile communication systems.

In a mobile communication system (hereinafter, referred to as "a beamforming system") using beamforming technology, transmit (Tx) beamforming or/and receive (Rx) beamforming are used. The Tx beamforming is generally a technique to focus a signal transmitted from each antenna in a specific direction using a plurality of antennas. The combination of the plurality of antennas is called an array antenna, and each of the antennas included in the array antenna is called an antenna element. The propagation distance of a signal is increased by using Tx beamforming, and since a signal is hardly received in directions other than a relevant direction, interference to other users is considerably reduced. The Rx beamforming is a technique to focus reception of radio waves in a specific direction by using a reception antenna array in a receiver. The signal sensitivity of a signal incoming in a relevant direction is increased by using Rx beamforming and signals incoming in directions other than the relevant direction are excluded from received signals, thereby blocking interference signals. In such a beamforming system, a signal is focused in a specific direction, and therefore, a transmission path of a beam is changed depending on in which direction a beam is transmitted. As a transmission path of a beam is changed, a difference in signal reception occurs in a receiver.

Therefore, there is a need to transmit and receive data in consideration of a difference in arrival time between signals which may be caused by different beam transmission paths.

SUMMARY

To address the above-discussed deficiencies, it is a primary object to provide a method and apparatus for transmitting and receiving data in consideration of a difference in arrival signals which may be caused by a difference between beam transmission paths in a beamforming system.

Another object of the present disclosure is to provide a method and apparatus for performing feedback of information indicating a difference in arrival time between received signals which may be caused by a difference between beam transmission paths.

According to an aspect of the present disclosure, a method for operating a mobile station in a mobile communication system includes: receiving a plurality of transmit (Tx) beam signals from a base station; generating indication information for indicating a difference in arrival time between effective Tx beam signals selected from the received Tx beam signals; and transmitting feedback information including the indication information to the base station.

According to another aspect of the present disclosure, a method for operating a base station in a mobile communication system includes: transmitting a plurality of transmit (Tx) beam signals; and receiving, from a mobile station, feedback information including indication information indicating a difference in arrival time at the mobile station between effective Tx beam signals selected from the Tx beam signals.

According to another aspect of the present disclosure, an apparatus for a mobile station in a mobile communication system, includes: a receiver for receiving a plurality of transmit (Tx) beam signals from a base station; a controller for generating indication information indicating a difference in arrival time between effective Tx beam signals selected from the received Tx beam signals; and a transmitter for transmitting feedback information including the indication information to the base station.

According to another aspect of the present disclosure, an apparatus for a base station in a mobile communication system includes: a transmitter for transmitting a plurality of transmit (Tx) beam signals; and a receiver for receiving, from a mobile station, feedback information including indication information indicating a difference in arrival time at the mobile station between effective Tx beam signals selected from the Tx beam signals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A to 3C illustrate a problem which may be caused by a difference in signal arrival time between beam transmission paths during beam switching;

FIGS. 6A and 6B illustrate an operation of transmitting information indicating a difference in arrival time between Tx beams according to another embodiment of the present disclosure;

FIGS. 8A and 8B illustrate an operation of transmitting information indicating a difference in arrival time between Tx beams according to an embodiment of the present disclosure;

FIGS. 10A to 10H illustrate another example of an operation of transmitting information indicating a difference in arrival time between Tx beams according to an embodiment of the present disclosure;

FIGS. 11A to 11P illustrate another example of an operation of transmitting information indicating a difference in arrival time between Tx beams according to an embodiment of the present disclosure;

DETAILED DESCRIPTION

FIGS. 1A through 17, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged beamforming based mobile communication system.

Embodiments of the present disclosure, which will be described below, transmit and receive data in consideration of a difference in arrival time of received signals which is caused because beam transmission paths are different from each other in a beamforming-based mobile communication system (hereinafter referred to as a "beamforming system"). Since the transmission paths of a beam transmitted by a transmitter apparatus (for example, base station (BS)) of the beamforming system are different from each other, a difference in arrival time between signals received by a receiver apparatus (for example, a mobile station) may be caused. The receiver apparatus feeds information indicating the difference in arrival time between the received signals back to the receiver apparatus. Thereafter, the transmitter apparatus performs assignment of hybrid beamforming, beam switching, or the like for data transmission and reception in consideration of the fed-back information. Although there will be described a case in which the transmitter apparatus is a base station and the receiver apparatus is mobile station for convenience of description, it is noted that embodiments of the present disclosure may be applied to a case where the transmitter apparatus is a mobile station and the receiver apparatus is a base station.

In the beamforming system, a signal is focused in a specific direction, and therefore, a transmission path of a beam is changed depending on in which direction a beam is transmitted. Since time is required proportionally to a propagation distance of radio waves or signals, a signal is delayed and then received by a receiver. Therefore, a difference in signal reception delay time between beams (a difference in arrival time of signals) is dependent on a difference in distance between different transmission paths.

Figures 1A, 1B:
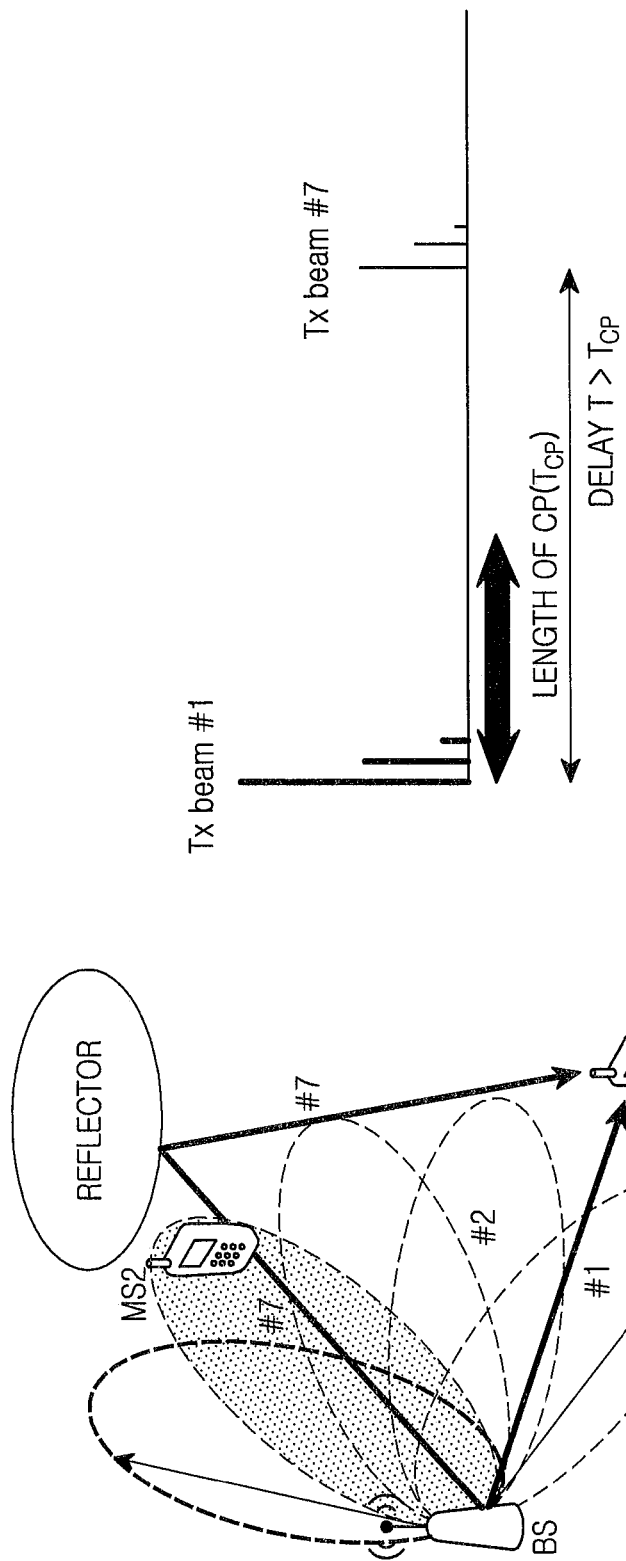
FIGS. 1A and 1B illustrate a difference in signal arrival time between beam transmission paths in a beamforming-based mobile communication system.

FIGS. 1A and 1B illustrate a difference in signal arrival time between beam transmission paths in a beamforming system.

FIG. 1A is a conceptual diagram schematically showing two different downlink transmit (Tx) beam paths #1 and #7 through a downlink signal is received by a MS1. As shown in FIG. 1A, the Tx beam path #1 has relatively a short transmission distance, and therefore, a signal through the Tx beam path #1 arrives at an earlier time point (a delay time between transmission and reception beams is short). In addition, the Tx beam path #7 has relatively a long transmission distance, and therefore, a signal through the Tx beam path #7 arrives at a later time point (a delay time between transmission and reception beams is long).

FIG. 1B illustrates a difference in delay time between beams (a difference in arrival time between beams), which is caused by different two beam paths by illustrating the arrival time point of the signal #1 and the arrival time point of the signal #7 together with respect to the arrival time point of the signal #1 which is early received by the MS1 in order to find out a difference in signal delay time dependent on different paths on assumption that the two signals are transmitted at the same time.

High frequencies are expected to be employed as transmission frequencies in a 5G cellular mobile communication system which is considered as a next-generation mobile communication system. In this case, the duration of a symbol may be expected to be shorter than that in an existing 4G cellular system. Therefore, signal quality degradation may occur due to delay of beams through beam transmission paths.

Therefore, problems which may occur due to a difference in delay time between transmitted signals in the beamforming system, that is, a difference in reception time points between signals arriving at a receiver will be described and solutions will be proposed below.

In the beamforming system, performance may be degraded due to a time difference in reception delay time between beam paths during hybrid beamforming or beam switching.

Figures 2A, 2B:
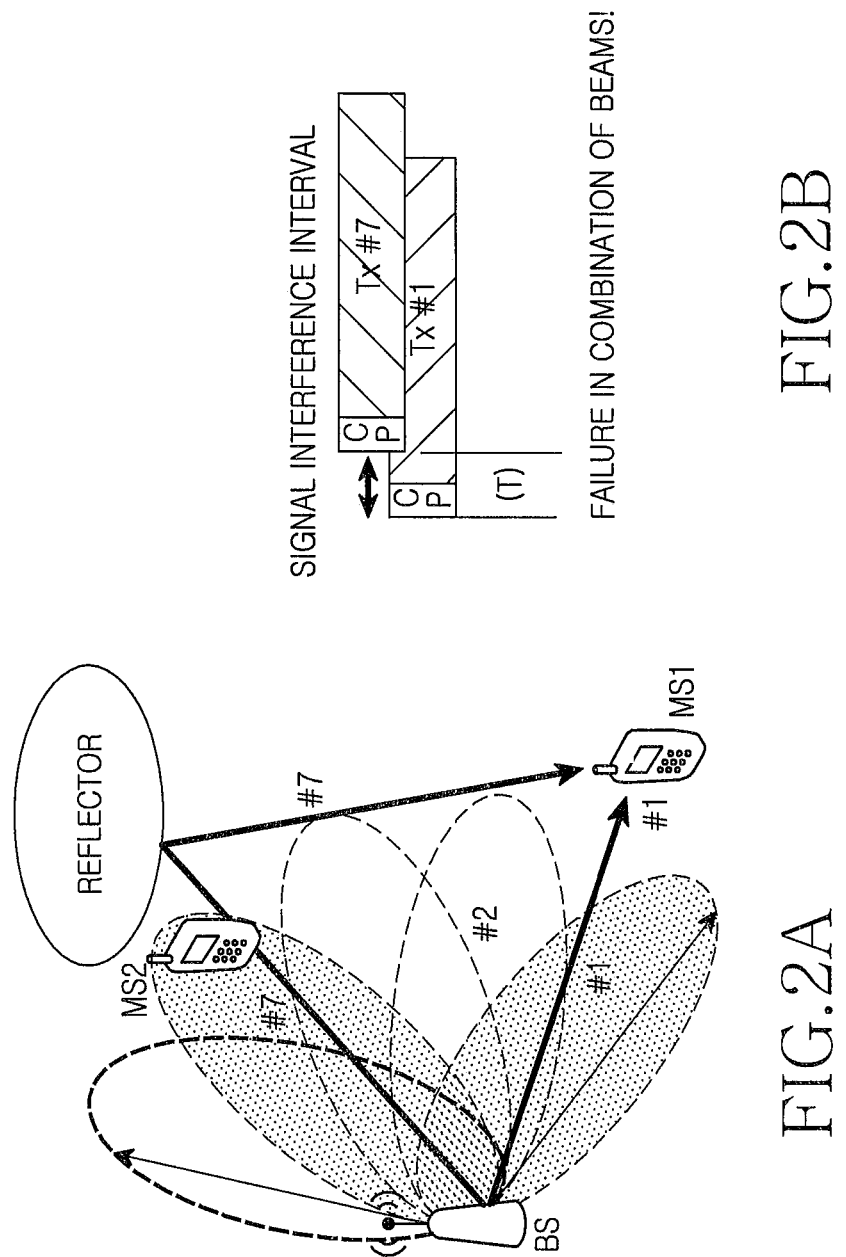
FIGS. 2A and 2B illustrate a problem which may be caused by a difference in signal arrival time between beam transmission paths during hybrid beamforming.

FIGS. 2A and 2B illustrate a problem which may be caused by a difference in arrival time between signals through beam transmission paths during hybrid beamforming.

In a case where one or more beams are simultaneously transmitted to one mobile station using digital pre-coding like hybrid beamforming (see FIG. 2A), when two beams in which a difference in signal reception delay time is larger than or equal to a time threshold value 'Tthreshold' are selected, an error may occur in which the signals of the two beams are not combined with each other in a receiver. In particular, when a time difference in signal reception delay time between beams is longer than the length of a cyclic prefix (CP) for an orthogonal frequency division Multiplexing (OFDM) symbol in an OFDM communication system, a phenomenon may occur in which beam-combining performance is dramatically reduced.

Hybrid beamforming scheme refers to a beamforming technique into which analog beamforming used to obtain a high antenna gain and digital precoding used to achieve a high data transmission rate in a multiple-antenna system are combined. The hybrid beamforming technique is to form a beam through analog beamforming and, when one or more analog beams have been formed, perform digital precoding similar to what is applied with respect to existing multiple antennas in a baseband, thereby receiving a high-reliability signal or expecting a high system capability.

When a receiver, for example, a mobile station receives a signal by combining one or more analog beams transmitted through different signal transmission paths, a difference in arrival time between signals may be increased due to a difference between transmission paths through which the analog beams are respectively transmitted. When the difference in signal arrival time exceeds a threshold value, for example, the length of a CP for an OFDM communication system, a signal to be combined with a beam #1 early received includes any interference component and a signal of a beam #7 together. Therefore, the performance of the hybrid beamforming technique using combination of beams is considerably reduced.

FIGS. 3A to 3C are diagrams describing a problem which may occur during beam switching due to a difference in arrival time between signals transmitted through beam transmission paths.

In a case where a transmitter apparatus, for example, a base station performs a beam switching operation of transmitting a specific Tx beam and consecutively transmitting another specific Tx beam, when a Tx beam signal is delayed before arrival, the Tx beam signal is superimposed on a subsequent Tx beam signal, thereby degrading received signal quality. When the delay time is smaller than a time threshold value (Tthreshold), for example, the length of a cyclic prefix (CP) for an OFDM symbol, the delay time does not matter. On the contrary, when the delay time is larger than or equal to the time threshold value, the delay time may cause degradation in signal quality.

A transmitter apparatus, for example, a base station (BS) serves a MS2 through a beam of #7 and consecutively serves a MS1 through a beam of #1 (see FIGS. 3A and 3B). A signal of the beam of #7 is transmitted to serve the MS2, but is simultaneously delivered to the MS1. The signal of the beam of #7 is delayed by a certain time ($\tau$#7) before delivery to the MS1. When the relevant delay time ($\tau$#7) is larger than or equal to a threshold value, for example, is larger than or equal to the CP period of an OFDM symbol in the OFDM communication system, inter-symbol interference (ISI) may be caused between the signal transmitted to the MS1 through the beam of #1 and the signal transmitted to the MS2 through the beam of #7 in a previous frame, which suffers delay Such ISI causes degradation of received signal quality in the MS1.

According to embodiments of the present disclosure, when selecting effective Tx beams from a transmitter apparatus (for example, a base station), a receiver apparatus (for example, a mobile station) transmits information about a difference between beam paths to the transmitter apparatus in advance, thereby figuring out a problem caused by the difference in signal reception delay time dependent on the difference between beam paths and assigning beams so as to prevent the problem.

Figure 4:
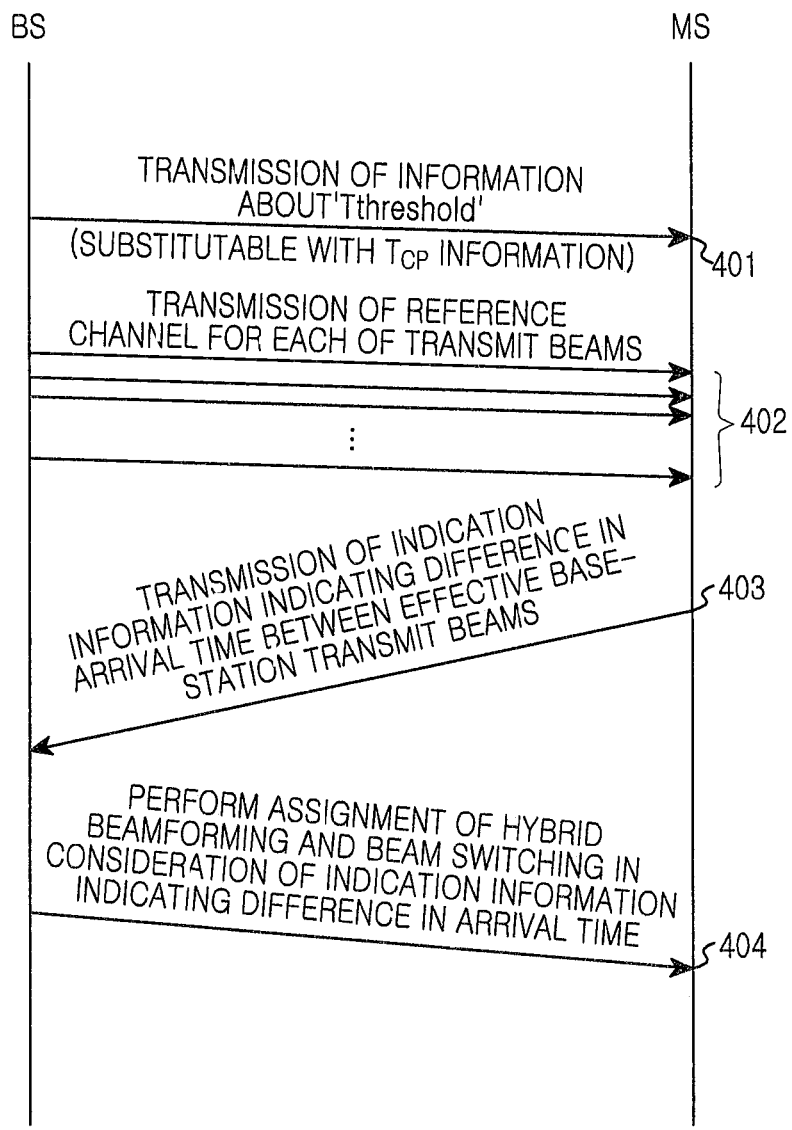
FIG. 4 illustrates a flow of signals transmitted and received between a base station and a mobile station according to embodiments of the present disclosure.

FIG. 4 illustrates a flow of signals transmitted and received between a base station and a mobile station according to embodiments of the present disclosure. Although signals are illustrated as being transmitted and received between one base station and one mobile station, is for the purpose of illustrating one example of the present disclosure. The present disclosure may be applied between one base station and a plurality of mobile stations.

In step 401, the base station transmits threshold information (e.g., information about 'Tthreshold') associated with delay between beams with respect to respective mobile stations. The threshold information may be transmitted through a broadcast channel or a separate control channel, or may be a value prearranged between a base station and a mobile station in advance. In particular, since the threshold value may be associated with the length (Tcp) of a cyclic prefix (CP) in an OFDM system, the length of the CP may be threshold information even when a separate notification is not performed.

In step 402, the base station transmits a downlink reference channel signal to which mobile stations may refer in order to measure channel quality information with respect to each of Tx beams of the base station. Each mobile station measures a time difference in signal delay time between the beams while measuring a downlink reference channel signals. Specifically, the mobile station measures a reference signal for each of the Tx beams transmitted by the base station. Thereafter, the mobile station sets a reference time point (time point of 0) to a time point at which the mobile station receives a specific Tx beam (a beam having the most excellent (best) signal quality or a beam received at an earliest time point) and measures respective signal reception time points with respect to effective Tx beams other than the specific Tx beam to calculate and digitize respective delay values.

In step 403, the mobile station transmits the channel quality index (CQI) measured with respect to each of the effective Tx beams to the base station as feedback information. That is, when the mobile station transmits information about effective base-station transmission beams along with information about a difference in delay time between the beams, the base station receives the two pieces of information and may only select beams in which a difference in delay time between the transmission beams is smaller than a time threshold value during hybrid beamforming and beam switching.

In step 404, the base station uses the feedback information received from the mobile station during hybrid beamforming or beam switching. That is, when the terminal transmits information about effective base-station Tx beams along with information about a difference in delay time between the beams, the base station receives the two pieces of information and may only select beams in which a difference in delay time between the transmission beams is smaller than a threshold time value upon hybrid beamforming and beam switching.

Again, referring to step 403, an operation of generating and transmitting information indicating a difference in arrival time at the mobile station between Tx beams may be implemented according to various embodiments as described below.

Figures 5A, 5B:
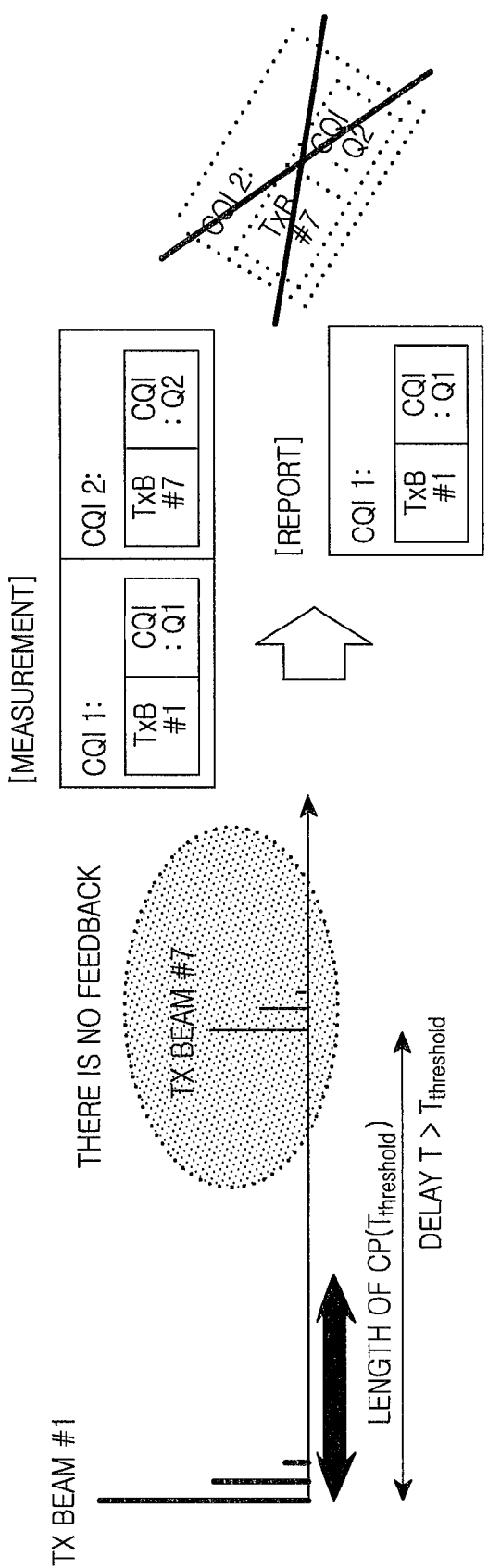
FIGS. 5A and 5B illustrate an operation of transmitting information indicating a difference in arrival time between Tx beams according to an embodiment of the present disclosure.

FIGS. 5A and 5B illustrate an operation of transmitting information indicating a difference in arrival time between Tx beams according to an embodiment of the present disclosure. According to this embodiment, a mobile station does not perform feedback operation with respect to Tx beams which are considerably delayed.

FIG. 5A illustrates a time difference in delay time between effective base-station Tx beams on a common time axis. The time difference in delay time between the effective base-station Tx beams are measured with respect to a signal which has a most excellent signal quality or arrives at an earlier time point after received signal intensities of the Tx beams from a transmitter apparatus have been measured in a receiver apparatus. In FIG. 5A, a difference between a time point at which a beam #1 having the most excellent signal quality arrives and a time point at which a beam #7 arrives is time T. When the difference in arrival time between signals is larger than or equal to a threshold value 'Tthreshold' or Tcp, the mobile station which has received the signals does not transmit information about the beam #7 (FIG. 5B) to a transmission base station through feedback information associated with channel information although the signal of the beam #7 is sufficiently excellent. In this case, a condition is satisfied in which the base station does not perform assignment of hybrid beamforming using the beams #1 and #7 simultaneously with respect to a relevant mobile station.

FIGS. 6A and 6B illustrate an operation of transmitting information indicating a difference in arrival time between Tx beams according to another embodiment of the present disclosure.

According to this embodiment, grouping is performed on beams which may be combined with each other for hybrid beamforming or do not cause a beam-switching related problem due to delay among Tx beams from a transmitter apparatus which are determined as being excellent as a result of measurement by a mobile station. For example, it is possible to group effective Tx beam signals in which a difference in arrival time between adjacent Tx beam signals is smaller than a preset threshold value among effective Tx beam signals which are sequentially arranged. Information of 1 bit (Flag=0 in FIGS. 6A and 6B) indicating whether a relevant beam is grouped may be transmitted as feedback information along with CQI. In this case, indication is performed by using information of 1 bit (Flag=1 in FIGS. 6A and 6B) with respect to Tx beams which are not included in its relevant group. Therefore, when receiving the feedback information, the transmitter apparatus may prevent hybrid beamforming using a delayed beam or exclude a Tx beam which may cause a problem upon beam switching at the time of scheduling.

In FIGS. 6A and 6B, a mobile station sequentially arranges the indexes of effective Tx beams in an order of #1, #2, #3, . . . for convenience. Channel quality information for the respective arranged effective Tx beams are Q1, Q2, Q3, . . . . According to an embodiment of the present disclosure, information indicating a difference in arrival time between Tx beams may be 1 bit located at a rightmost or leftmost position (in FIGS. 6A and 6B, at a rightmost position) in CQI information as feedback information.

For example, in FIG. 6A, Tx beams #1, #2 and #3 are grouped into one group and a Tx beam #4 is not grouped. Feedback information (CQI1) for the Tx beam #1 includes information (TxB #1) 11 about the Tx beam, channel quality information (Q1) 12, and information (Flag 0) 13 indicating whether a relevant beam is grouped. Feedback information (CQI2) for the Tx beam #2 includes information (TxB #2) 21 about the Tx beam, channel quality information (Q2) 22, and information (Flag 0) 23 indicating whether a relevant beam is grouped. Feedback information (CQI3) for the Tx beam #3 includes information (TxB #3) 31 about the Tx beam, channel quality information (Q3) 32, and information (Flag 0) 33 indicating whether a relevant beam is grouped. Feedback information (CQI4) for the Tx beam #4 includes information (TxB #4) 41 about the Tx beam, channel quality information (Q4) 42, and information (Flag 1) 43 indicating whether a relevant beam is grouped.

For example, in FIG. 6B, the Tx beams #1 is not grouped and the Tx beams #2, #3 and #4 are grouped into one group. Feedback information (CQI1) for the Tx beam #1 includes information (TxB #1) 11 about the Tx beam, channel quality information (Q1) 12, and information (Flag 1) 13 indicating whether a relevant beam is grouped. Feedback information (CQI2) for the Tx beam #2 includes information (TxB #2) 21 about the Tx beam, channel quality information (Q2) 22, and information (Flag 0) 23 indicating whether a relevant beam is grouped. Feedback information (CQI3) for the Tx beam #3 includes information (TxB #3) 31 about the Tx beam, channel quality information (Q3) 32, and information (Flag 0) 33 indicating whether a relevant beam is grouped. Feedback information (CQI4) for the Tx beam #4 includes information (TxB #4) 41 about the Tx beam, channel quality information (Q4) 42, and information (Flag 0) 43 indicating whether a relevant beam is grouped.

According to this embodiment, the base station may use Tx beams belong to one group for hybrid beamforming, beam switching, or the like.

Although the above-described embodiments resolve signal quality degradation and inter-symbol interference which are caused due to a difference in arrival time between a plurality of Tx beam signals, relative delay between the Tx beams is not indicated. For example, when Tx beams #2 and #3 are determined as being effective Tx beams as a result of measurement of received signals in a mobile station, there may be no problem because a difference value in delay time between the Tx beams #1 and #2 is smaller than Tthreshold or Tcp and a difference value in delay time between the Tx beams #2 and #3 is smaller than Tthreshold or Tcp. However, in a case where a difference value in delay time between the Tx beams #1 and #3 exceeds Tthreshold or Tcp, an embodiment may determine that the Tx beams #1, #2 and #3 are effective Tx beams and a difference value in delay time between a beam and a preceding beam (the beam #2 with respect to the beam #1 and the beam #3 with respect to the beam #23) is smaller than a threshold value Tthreshold or Tcp, and group information of the beams #1, #2 and #3 to perform feedback of the grouped information. Therefore, when the base station does not recognize this situation and transmits a signal through hybrid beamforming using the Tx beams #1 and #3, signal quality degradation may be caused. As a result, there is a need for a method of performing feedback of a relationship between beams. Additional embodiments which will be described below perform feedback of information of a relationship between Tx beams.

Before description of the embodiment below, a range of a difference value in delay time between beams is intended to be restricted. First, it is assumed that beams all have effective signal quality with respect to different beams and different beams pass through different paths. According to the assumption, there is illustrated an example in which paths are extremely different from each other in an example of FIG. 7.

Figure 7:
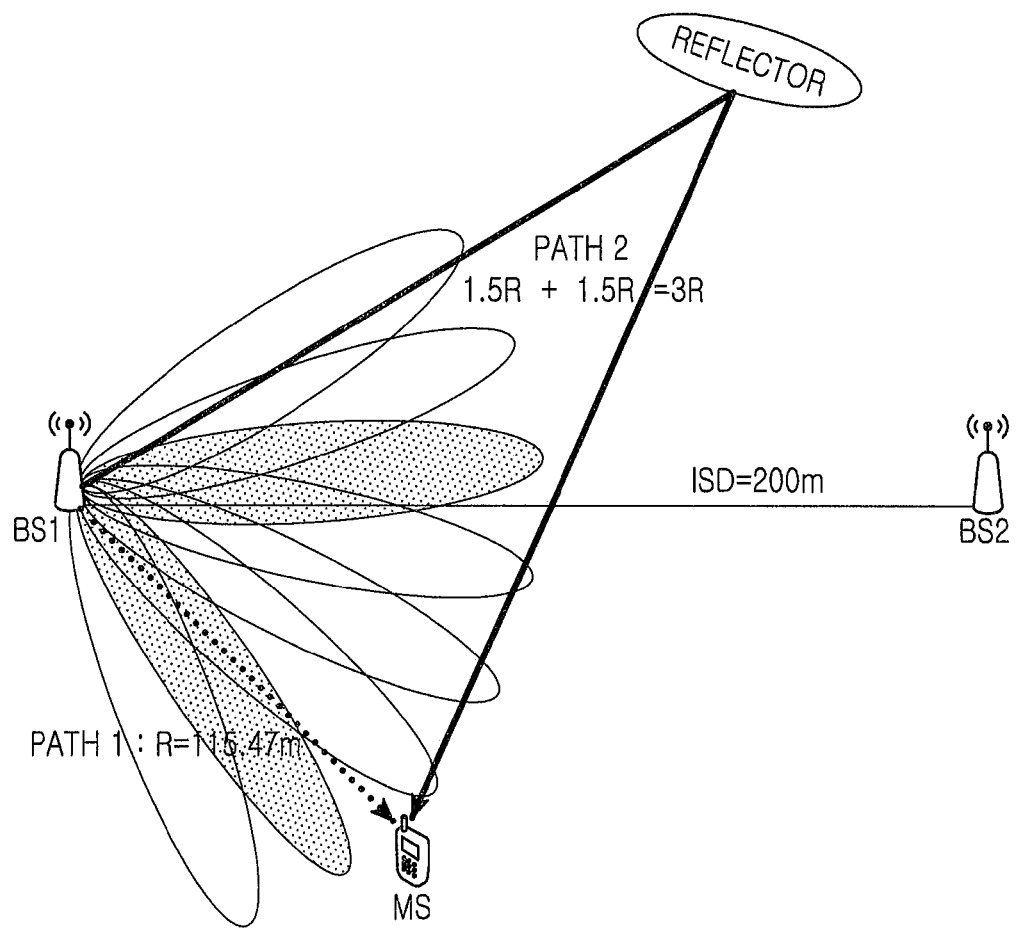
FIG. 7 illustrates a principle of yet another embodiment of the present disclosure.

FIG. 7 illustrates a principle of yet another embodiment of the present disclosure. FIG. 7 illustrates an example in which the propagation distance of path 1 to a specific mobile station is three times the propagation distance of path 2 to the specific mobile station when an inter-site distance (ISD) is 200 m. In FIG. 7, a straight distance between the mobile station and a BS1 is 115.47 m which corresponds to the radius of a cell having the ISD of 200 m. It is assumed that path 1 is a line of sight (LOS) path through which a signal is directly transmitted without any reflection, and path 2 is a path through a signal is transmitted to the mobile station by passing through a distance three times longer than path 1 due to diffraction and reflection. In the example illustrated in FIG. 7, a signal attenuation modeling of ITU-R M.2135 is used in order to calculate a signal attenuation amount dependent to a propagation distance as the following Equation (1):

UMi channel,LoS:PL=22.0 log 10(d)+28.0+20 log 10(fc)

UMi channel,NLoS:PL=36.7 log 10(d)+22.7+26 log 10(fc)  (1)

where d is a signal propagation distance (m) and fc is a transmission frequency (Hz) of a signal.

When a propagation distance is increased three times, an additional path attenuation of 10.5 dB is caused in an LoS environment and an additional path attenuation of 17.5 dB is caused in an NLoS environment according to Equation (1). That is, a difference in signal intensity between signals on path 1 and path 2 is ranged from 10 dB to 18 dB, which may be regarded as a maximum range on the assumption that both beams are effective in terms of propagation intensity. In the case where the assumption that the propagation distance of path 1 is three times the propagation distance of path 2 has been given, when it is assumed that a difference of signal delay time between beams is the maximum time difference, the difference value in delay time between beams may be calculated. When the travelling speed (speed of light) of radio waves is 3×10$^8$ m/s, a time period of 385 nsec is taken for a signal to arrive through the distance of 115.47 m of path 1 and a time period of 1155 nsec is taken for a signal to arrive through the distance of 346.41 m of path 3 which is three times the distance of path 1. Therefore, the time difference between the two beams is 770 nsec.

When it is assumed that the size of a CP is ranged from 400 to 500 nsec in a 5 G communication system, a delay time does not exceed two times the CP despite of an extreme environment as a result of the assumption. In the present embodiment, when it is assumed that a maximum delay time is two times the CP, the number of all cases associated with a difference in delay time between effective transmission beams is dependent on the number of the effective transmission beams which needs to be fed back from a mobile station to a base station. That is, the number of effective Tx beams may be two, three, four, or five. Respective cases of this embodiment are illustrated in FIGS. 8A to 11P.

FIGS. 8A and 8B illustrate an operation of transmitting information indicating a difference in arrival time between Tx beams according to an embodiment of the present disclosure. In this example, when a mobile station performs feedback of two effective Tx beams, all cases which may be caused between the Tx beams and a total bit number necessary to express the cases are illustrated.

As illustrated in FIGS. 8A and 8B, the number of cases which may be caused between two effective beams measured by the mobile station is two. Case 1 is a case in which a time difference in delay time between a first effective Tx beam #1 and a second effective Tx beam #2 does not exceed a threshold value (Tthreshold or Tcp) (see FIG. 8A). On the contrary, Case 2 is a case in which a time difference in delay time between the first effective Tx beam #1 and the second effective Tx beam #2 exceeds the threshold value (see FIG. 8B). In case 1 and case 2, symbol "○" marked in a beam index #1 represents that a relevant beam is a comparison target beam to be compared with a subsequent beam. In the expression of a beam #2 subsequent to the comparison target beam #1, when the subsequent beam #2 has a white background as in the comparison target beam #1, the beam is a beam in which a time difference in delay time between the beam and the comparison target beam is smaller than a threshold value. On the contrary, when the subsequent beam #2 has a background marked by symbol "▩" unlike the comparison target beam #1 in case 2, the beam is a beam in which a time difference in delay time between the beam and the comparison target beam is larger than or equal to a threshold value.

Since the number of all cases is two in the case illustrated in FIGS. 8A and 8B, the cases associated with a time difference in signal delay time between Tx beams may be expressed by using a feedback signal of 1 bit.

FIGS. 9A to 9D illustrate another example of an operation of transmitting information indicating a difference in arrival time between Tx beams according to an embodiment of the present disclosure. In this embodiment, all cases are illustrated with respect to a situation in which the number of effective Tx beams is three. Relationship between the beams illustrated in drawings may be defined as the following Table 1.

TABLE 1

| Cases | Description |
|---|---|
| [○][#] | A case where upon comparison with beam #a, a difference in delay time between beams #a and #b is smaller than T$_{threshold}$. |
| [○][▩] | A case where upon comparison with beam #a, a difference in delay time between beams #a and #b is larger than or equal to than T$_{threshold}$. |
| [○][▩] [○][▩] | A case where a difference in delay time between preceding beams is already larger than or equal to T$_{threshold}$, and therefore, a difference in delay time between subsequent beams (after beam #b) is smaller than T$_{threshold}$. |

Figure 9A:
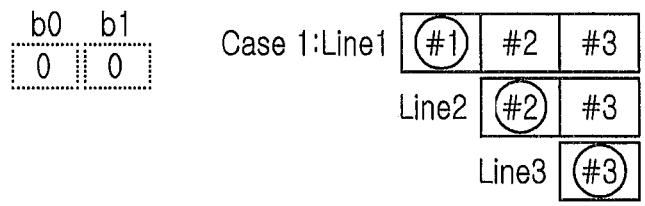
FIGS. 9A to 9D illustrate another example of an operation of transmitting information indicating a difference in arrival time between Tx beams according to an embodiment of the present disclosure.

Referring to FIG. 9A, Line 1 of case 1, a comparison target beam #1 marked by symbol "○" and subsequent beams #2 and #3 all have a white background, which means that a time difference in delay time between #1 and #2 and between #1 and #3 both are not larger than or equal to a threshold value. In Line 2 of case 1, the beam #2 marked by symbol "○" is a comparison target beam and the subsequent beam #3 has a white background, which means that a time difference in delay time between #2 and #3 is not larger than or equal to the threshold value. In Line 3 of case 1, there is no subsequent beam, and therefore, there is no case.

Figure 9B:
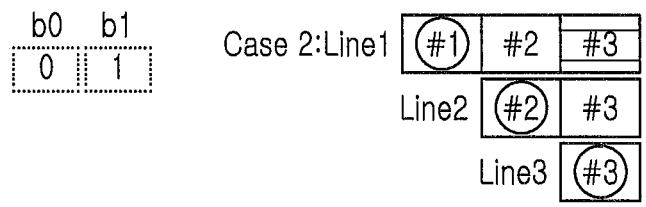

Referring to FIG. 9B, in Line 1 of case 2, a beam #2 has a white background and a beam #3 is marked by "▤" upon comparison with the comparison target beam #1, which mean that a time difference in delay time between #1 and #2 is not larger than or equal to a threshold value and a time difference in delay time between #1 and #3 is larger than or equal to the threshold value. In Line 2 of case 2, comparison target beams #2 and #3 have a white background respectively, which means that a time difference in delay time between #1 and #2 is not larger than or equal to the threshold value.

Figure 9C:
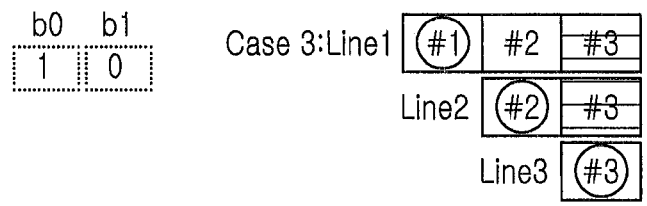

Referring to FIG. 9C, Line 1 of case 3 shows that a time difference in delay time between #1 and #2 is smaller than a threshold value and a time difference in delay time between #1 and #3 is larger than or equal to the threshold value, like Line 1 of case 2. Line 2 of case 3 shows that a time difference in delay time between #2 and #3 is larger than or equal to the threshold value.

Figure 9D:
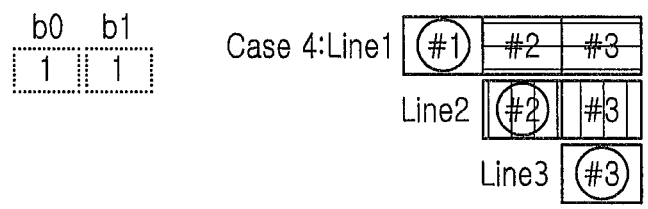

Referring to FIG. 9D, in Line 1 of case 4, beams #2 and #3 both are marked by "▤" upon comparison with the beam #1, which means that a time difference in delay time between #1 and #2 is larger than or equal to the threshold value, and therefore, a time difference in delay time between #1 and #3 is larger than or equal to the threshold value.

Since the difference in delay time between #1 and #2 is larger than or equal to the threshold value and it is assumed that a maximum difference in delay time exceeds two times the threshold value (Tthreshold or Tcp), the difference in delay time between #2 and #3 is not larger than or equal to the threshold value. That is, when a difference in delay time is already larger than or equal to the threshold value before a specific comparison target beam, a difference in delay time between subsequent beams is smaller than the threshold value. In this case, all beams are marked by symbol "▦" as in Line 2 of case 4, and cases associated with the subsequent beams are not considered.

In a case where three effective Tx beams need to be fed back, total four cases may occurs. When it is assumed that there is feedback information of two bits to express such relationships, information about a difference in delay time between effective Tx beams may be displayed.

FIGS. 10A to 10H illustrate another example of an operation of transmitting information indicating a difference in arrival time between Tx beams according to an embodiment of the present disclosure. In this example, there are provided all cases which may be generated in a case of needing to perform feedback of four effective Tx beams.

FIGS. 10A to 10H illustrate cases when three effective Tx beams are used. Since information of 3 bits may express all cases associated with delay of Tx beams, delay information between all four effective Tx beams may be indicated when feedback information of 3 bits is assumed.

Referring to FIG. 10A, in Line 1 of case 1, upon comparison with a beam #1, a time difference in delay time is smaller than a threshold value with respect to all subsequent beams #2, #3, and #4. In Line 2 of case 1, upon comparison with the beam #2, a time difference in delay time is smaller than the threshold value with respect to all subsequent beams #3 and #4. In Line 3 of case 1, upon comparison with the beam #3, a time difference in delay time is smaller than the threshold value with respect to the subsequent beam #4.

Referring to FIG. 10B, in Line 1 of case 2, upon comparison with the beam #1, a time difference in delay time is smaller than a threshold value with respect to subsequent beams #2 and #3, but a time difference in delay time is larger than the threshold value with respect to #4. In Line 2 of case 2, upon comparison with the beam #2, a time difference in delay time is smaller than the threshold value with respect to all subsequent beams #3 and #4. In Line 3 of case 2, upon comparison with the beam #3, a time difference in delay time is smaller than or equal to the threshold value with respect to the subsequent beam #4.

Referring to FIG. 10C, in Line 1 of case 2, upon comparison with the beam #1, a time difference in delay time is smaller than the threshold value with respect to subsequent beams #2 and #3, but a time difference in delay time is larger than or equal to the threshold value with respect to beam #4. In Line 3 of case 3, upon comparison with the beam #2, a time difference in delay time is smaller than the threshold value with respect to the subsequent beam #3, but a time difference in delay time is larger than or equal to the threshold value with respect to the beam #4. In Line 3 of case 3, upon comparison with the beam #3, a time difference in delay time is smaller than the threshold value with respect to the subsequent beam #4.

Referring to FIG. 10D, in Line 1 of case 4, upon comparison with the beam #1, a time difference in delay time is smaller than the threshold value with respect to subsequent beams #2 and #3, but a time difference in delay time is larger than or equal to the threshold value with respect to beam #4. In Line 3 of case 3, upon comparison with the beam #2, a time difference in delay time is smaller than the threshold value with respect to the subsequent beam #3, but a time difference in delay time is larger than or equal to the threshold value with respect to the beam #4. In Line 3 of case 3, upon comparison with the beam #3, a time difference in delay time is larger than or equal to the threshold value with respect to the subsequent beam #4.

Referring to FIG. 10E, in Line 1 of case 5, upon comparison with the beam #1, a time difference in delay time is smaller than the threshold value with respect to the subsequent beam #2, but a time difference in delay time is larger than or equal to the threshold value with respect to the beams #3 and #4. In Line 2 of case 5, upon comparison with the beam #2, a time difference in delay time is smaller than the threshold value with respect to all subsequent beams #3 and #4. Since, in Line 3 of case 5, a time difference in delay time between the beam #1 and the beam #3 is already larger than or equal to the threshold value upon comparison with the beam #3, it is impossible that a time difference in delay time between the beams #3 and #4 is larger than the threshold value.

Referring to FIG. 10F, in Line 1 of a case 6, upon comparison with the beam #1, a time difference in delay time is smaller than the threshold value with respect to the subsequent beam #2, but a time difference in delay time is larger than the threshold value with respect to the beams #3 and #4. In Line 2 of the case 6, upon comparison with the beam #2, a time difference in delay time is smaller than the threshold value with respect to the subsequent beam #3, but a time difference in delay time is larger than or equal to the threshold value with respect to the beam #4. Since, in Line 3 of case 6, a time difference in delay time between the beam

1 and the beam #3 is already larger than or equal to the threshold value upon comparison with the beam #3, it is impossible that a time difference in delay time between the beams #3 and #4 is larger than the threshold value.

Referring to FIG. 10G, Line 1 of case 7 shows that, with comparison with the beam #1, a time difference in delay time is smaller than the threshold value with respect to the subsequent beam #2, but a time difference in delay time is larger than or equal to the threshold value with respect to the beams #3 and #4. In Line 2 of case 7, upon comparison with the beam #2, a time difference in delay time is larger than or equal to the threshold value with respect to all subsequent beams #3 and #4. Since, in Line 3 of the case 7, a time difference in delay time between the beam #1 and the beam #3 is already larger than or equal to the threshold value upon comparison with the beam #3, it is impossible that a time difference in delay time between the beams #3 and #4 is larger than or equal to the threshold value.

Referring to FIG. 10H, Line 1 of case 8 shows that, upon comparison with a beam #1, a time difference in delay time is larger than or equal to a threshold value with respect to all subsequent beams #2, #3, and #4. In Line 2 of case 8, a time difference in delay time between the beam #1 and the beam #2 is already larger than or equal to the threshold value upon comparison with the beam #2, and therefore, a time difference in delay time between beams subsequent to the beam #3 is not larger than or equal to the threshold value. In Line 3 of the case 8, a time difference in delay time between the beam #1 and the beam #3 is already larger than or equal to the threshold value upon comparison with the beam #3, and, therefore, a time difference in delay time between the beams #3 and #4 is not larger than or equal to the threshold value.

As shown in the above description with reference to FIGS. 8A to 10H, the number of cases associated with a difference in delay time between transmit (Tx) beams may be expected from the number of effective Tx beams. When the number of effective Tx beams is two, the number of cases associated with a difference in delay time between Tx beams is two, which may be expressed by using delay time difference information of 1 bit. When the number of effective Tx beams is three, the number of cases associated with a difference in delay time between Tx beams is four, which may be expressed by using delay time difference information of 2 bit. When the number of effective Tx beams is four, the number of cases associated with a difference in delay time between Tx beams is eight, which may be expressed by using delay time difference information of 3 bit. As a result, when the number of effective Tx beams is N, the number of all cases may be expressed by $2^{N-1}$, and therefore, all delay information between effective Tx beams may be expressed by using feedback information of (N−1) bits.

For confirmation of the result, in a case in which the number of effective Tx beams is five, the number of all cases is $2^{5-1}$, and all delay information between effective Tx beams may be expressed by using information of 4 (=5−1) bits. The number of all cases for five effective Tx beams is expected to be 25-1 as illustrated in FIGS. 11A to 11P, and may be expressed by information of 4 bits.

In summary, in this embodiment of transmitting delay information between Tx beams, it is assumed that a time difference between Tx beams is at most two times a threshold value. Therefore, time difference information between effective Tx beams may be transmitted to the base station by using information of minimum bits expressing the number of cases for a time difference or delay between beams except for cases which may not occur in practice.

Figure 12:
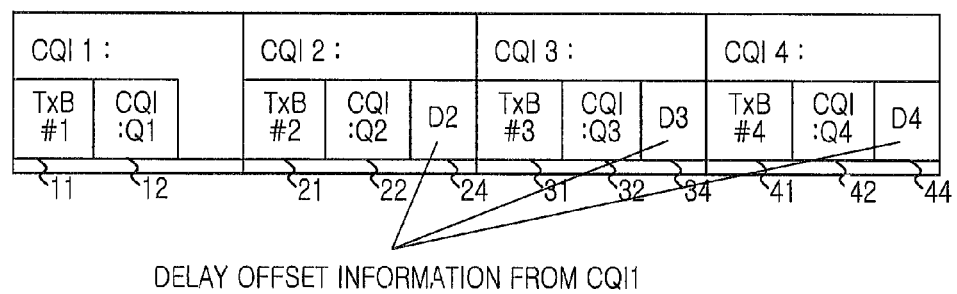
FIG. 12 illustrates an operation of transmitting information indicating a difference in arrival time between Tx beams according to still yet another embodiment of the present disclosure.

FIG. 12 illustrates an operation of transmitting information indicating a difference in arrival time between Tx beams according to still yet another embodiment of the present disclosure. This embodiment provides a method of transmitting relative delay values directly measured by a mobile station in feedback information for a base station and transmitting feedback information. Relative delay information values with respect to an effective Tx beam #1 are included in feedback information associated with Tx beams #2, #3, and #4. The reference effective Tx beam #1 may be a Tx beam having the most excellent signal quality or a Tx beam first received.

For example, feedback information associated with the beam #1 includes information 11 about the Tx beam and channel quality information 12. Feedback information associated with the beam #2 includes information 21 about the Tx beam, channel quality information 22, and a relative delay information value (D2) 24 relative to the beam #1. Feedback information associated with the beam #3 includes information 31 about the Tx beam, channel quality information 32, and a relative delay information value (D3) 34 relative to the beam #1. Feedback information associated with the beam #4 includes information 41 about the Tx beam, channel quality information 42, and a relative delay information value (D4) 44 relative to the beam #1.

As in the above-described embodiments, when the mobile station transmits information about effective base-station Tx beams and feedback information including delay information between respective beams in step 403 of FIG. 4, the base station perform a hybrid beamforming or beam switching operation in consideration of the feedback information received.

When performing the hybrid beamforming operation, the base station classifies beams, the base station classifies beams in which a difference in delay time between effective base-station Tx beams does not exceed a time threshold value as beams for beamforming among the effective base-station Tx beams in step 403. When hybrid beamforming is applied with respect to a relevant mobile station for a transmission method, the base station performs determination to select the beams in which a difference in delay time between Tx beams is smaller than the time threshold value.

When beam switching is performed, the base station needs to perform a specific assignment operation to prevent the problem associated with beam switching described with reference FIGS. 3A and 3B at the time of assigning a signal channel which may be received by a relevant mobile station, for example, a broadcast channel, a control channel, an uplink feedback channel for the relevant mobile station, and a downlink data channel for the relevant mobile station in a case where there are beams in which a difference in delay time between effective base-station Tx beams exceeds a time threshold value among the effective base-station Tx beams of the mobile station. Specifically, the base station may prevent beam switching that causes ISI by not continuously assigning a combination of beams in which a difference in delay time between Tx beams to a specific mobile station exceeds the time threshold value. In addition, the base station may prevent ISI by assigning Tx beams having a relatively large delay value later when there is a need to continuously assign beams in which a difference in delay time between Tx beams for a specific mobile station exceeds the time threshold value.

FIGS. 13A to 13F illustrate inter-symbol interference (ISI) prevented from occurring when information indicating a difference in arrival time between Tx beams is used upon beam switching according to embodiments of the present disclosure.

Figure 13A:
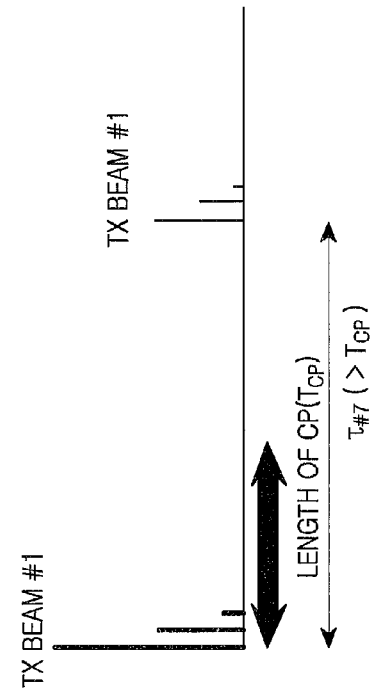
FIGS. 13A to 13F illustrate inter-symbol interference (ISI) prevented from occurring when information indicating a difference in arrival time between Tx beams is used upon beam switching according to embodiments of the present disclosure.
Figure 13B:
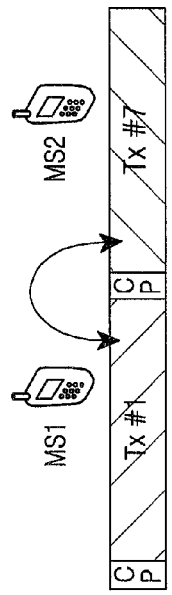
Figure 13D:
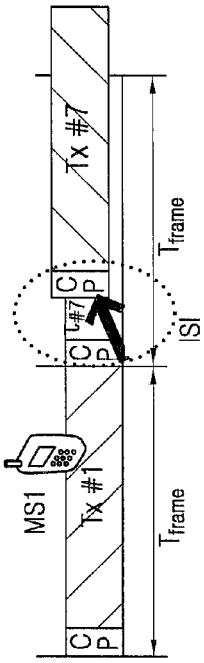
Figure 13C:
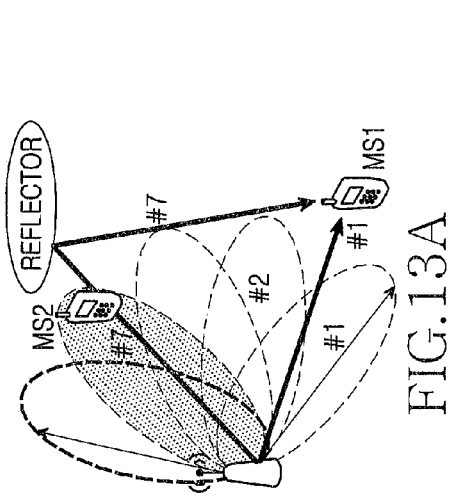
Figure 13E:
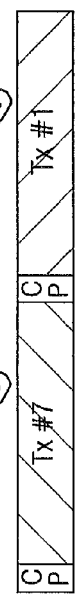
Figure 13F:
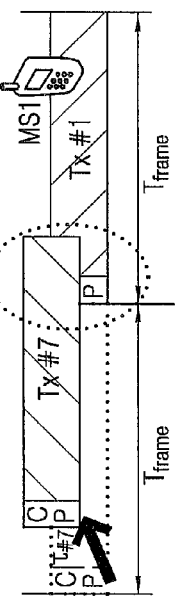

A beam #1 and a beam #7 both interfere with a MS1, the beam #7 has a larger delay time than the beam #1 with respect to the MS1. When a difference in signal delay time between the beams #1 and #7 is τ#7, the beam #7 having the relatively large delay time is first assigned, and thereafter, the beam #1 is assigned, a problem of ISI may be caused due to beam switching as illustrated in FIG. 13E. In order to prevent the above problem, the beam #7 having the relatively large delay time is assigned later and the beam #1 having a relatively small delay time is assigned first as illustrated in FIG. 13D, thereby preventing occurrence of ISI as in FIG. 13F.

In such a case where mobile stations transmit information about a time difference in delay time between beams, the base station may perform assignment to prevent degradation in signal quality during hybrid beamforming or beam switching based on the information.

Figure 14:
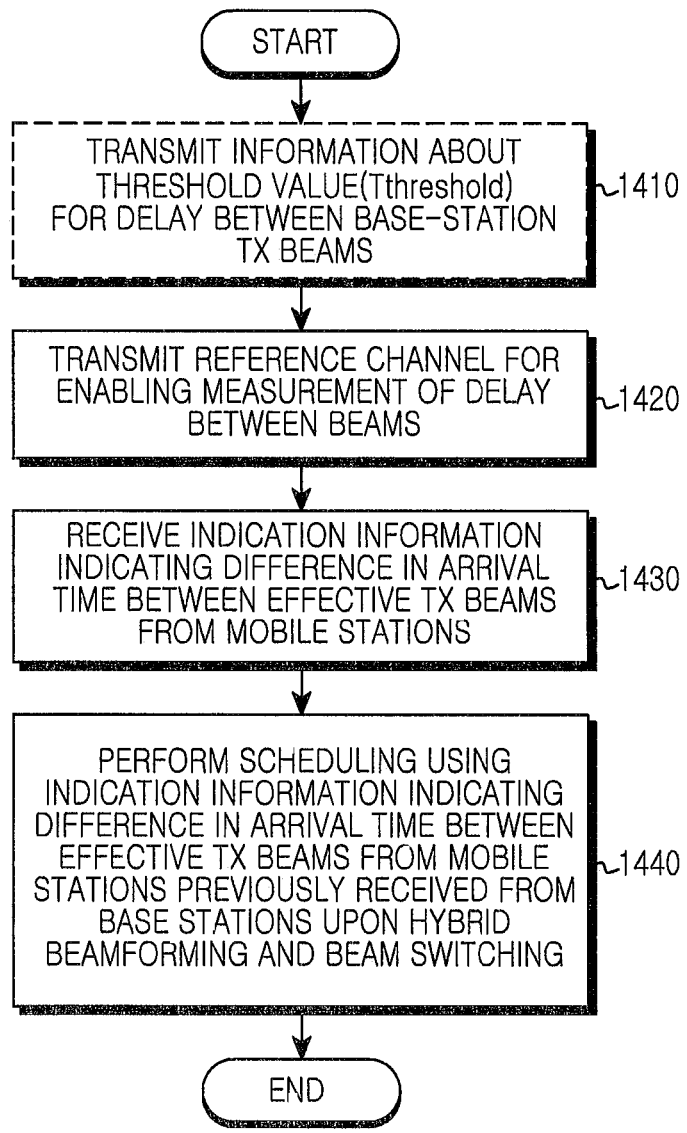
FIG. 14 is a flowing chart illustrating a process of a base station for operations according to embodiments of the present disclosure.

FIG. 14 is a flowchart illustrating a process of a base station for operations according to embodiments of the present disclosure.

In step 1410, the base station transmits threshold information Tthreshold for delay times of Tx beams through a broadcast channel. The threshold information may be a value prearranged between the base station and a mobile station in advance. Alternatively, the threshold value information may be substituted with the length Tcp of a CP, thereby requiring no transmission.

In step 1420, the base station transmits a reference channel for each beam through which measurement for beam delay is possible in the mobile station. Generally, downlink beams are arranged through transmission of the reference channel for each beam in a beamforming system. The base station transmits a relevant reference channel to a mobile station, thereby enabling the mobile station to use the channel upon measurement of delay of beams.

In step 1430, the base station receives information (indicating a difference in arrival time) about a difference in delay time between effective Tx beams in each mobile station from the each mobile station. Since each mobile station periodically transmits channel quality through an uplink in a general system, the mobile station may transmit information about the difference in delay time between the effective Tx beams together when transmitting information about effective Tx beams and theirs signal quality. In this case, the delay information may be transmitted according to one of the four methods of the above-described embodiments.

In step 1440, the base station performs beam assignment so as to prevent degradation in signal quality in each mobile station by using information about a difference in delay time between the effective Tx beams on the each mobile station which is received from the each mobile station when performing hybrid beamforming or beam switching.

Figure 15:
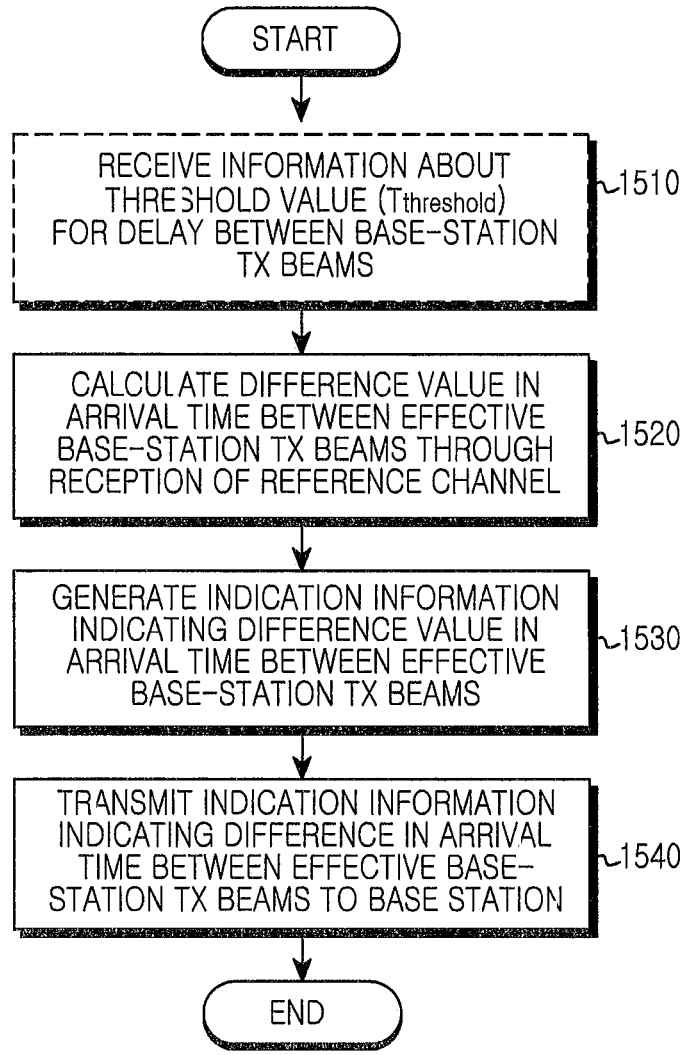
FIG. 15 is a flowchart illustrating a process of a mobile station for operations according to embodiments of the present disclosure.

FIG. 15 is a flowchart illustrating a process of a mobile station for operations according to embodiments of the present disclosure.

In step 1510, the mobile station receives information about a delay threshold value through a broadcast channel from a base station. The information may be substituted with a value prearranged between the base station and the mobile station or the length Tcp of a CP.

In step 1520, the mobile station receives a reference channel for each beam transmitted by the base station and measures the delay time of each beam to calculate and store information about a time difference in delay time between the beams.

In step 1530, the mobile station generate indication information of a number of bits indicating information about the time difference in delay time between the beams In this case, a method of generating information of bits may be applied according to one of the four methods of the above-described embodiments.

In step 1540, the mobile station transmits indication information indicating information about the time difference in delay time between the beams to the base station as feedback information. In this case, information about effective beams and signal quality information for the effective beams may be included in the feedback information and then transmitted.

Figure 16:
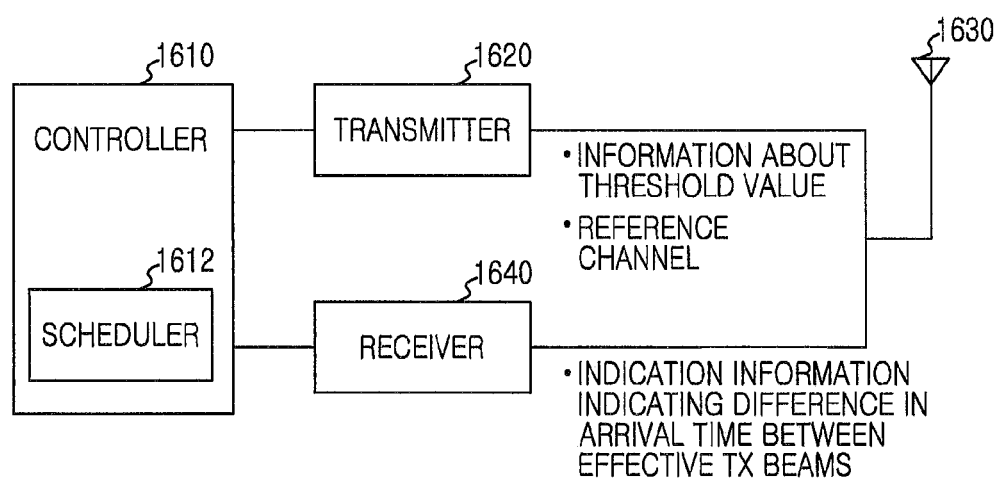
FIG. 16 is a block diagram illustrating a base station for operations according to embodiments of the present disclosure.

FIG. 16 is a block diagram illustrating a base station for operations according to embodiments of the present disclosure. The base station includes a controller 1610, a transmitter 1620, an antenna 1630, and a receiver 1640. The controller 1610 includes a scheduler 1612.

The transmitter 1620 transmits a plurality of Tx beam signals. The receiver 1640 receives, from a mobile station, feedback information including indication information indicating a difference in arrival time at a mobile station between effective Tx beam signals selected from the Tx beam signals.

The feedback information may further include information about the effective Tx beam signals and channel quality information with respect to the effective Tx beam signals. The plurality of Tx beam signals may be reference channel signals. The effective Tx beam signals may be a predetermined number of selected Tx beam signals having excellent received signal quality among the Tx beam signals.

According to an embodiment, the indication information may include information indicating whether the selected effective Tx beam signals are respectively included in grouped effective Tx beam signals. The grouped effective Tx beam signals may be effective Tx beam signals in which a difference in arrival time between adjacent Tx beam signals is smaller than a preset threshold value among the effective Tx beam signals which are sequentially arranged. The threshold value may be a value determined based on the length of a cyclic prefix (CP).

According to another embodiment, the indication information may be information generated based on a relationship of a difference in arrival time between the selected effective Tx beam signals. The relationship may indicate whether the difference in arrival time between the selected effective Tx beam signals is larger than or smaller than a preset threshold value. The threshold value may be a value determined based on the length of a cyclic prefix (CP). The indication information may be information of bits, the number of which is one less than the number of the selected effective Tx beam signals.

According to another embodiment, the indication information may be information indicating a difference in arrival time between one reference effective Tx beam signal and each of the other effective Tx beam signals among the selected effective Tx beam signals. The reference effective Tx beam signal may be an effective Tx beam signal having the most excellent received signal quality of the selected effective Tx beam signals. The reference effective Tx beam signal may be an effective Tx beam signal received at an earliest time point of the selected effective Tx beam signals.

The scheduler 1612 of the controller 1610 performs a scheduling operation, such as hybrid beamforming or beam switching by using feedback information received from the mobile station.

Figure 17:
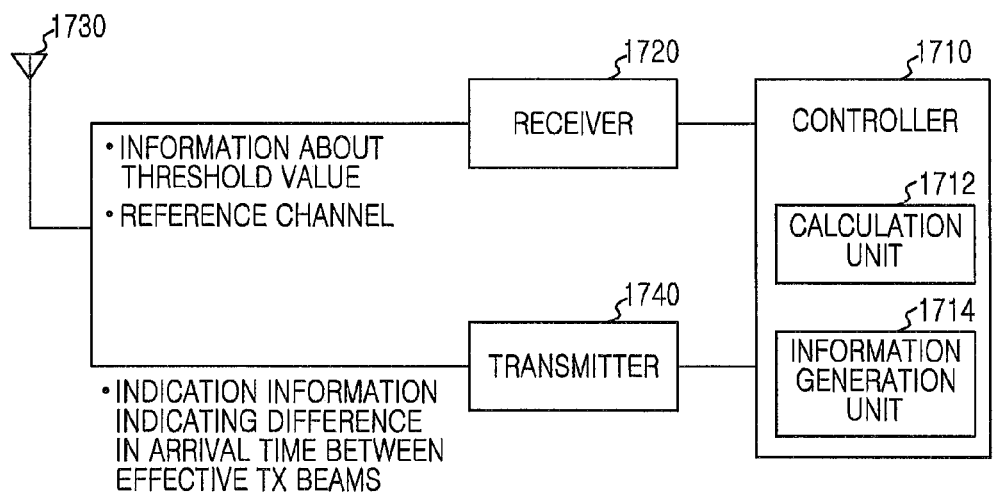
FIG. 17 is a block diagram illustrating a mobile station for operations according to embodiments of the present disclosure.

FIG. 17 is a block diagram illustrating a mobile station for operations according to embodiments of the present disclosure. The mobile station includes a controller 1710, a receiver 1720, an antenna 1730, and a transmitter 1740. The controller 1710 includes a calculation unit 1712 and an information generation unit 1714.

The receiver 1720 receives a plurality of Tx beam signals from a base station. The controller 1710 generates indication information indicating a difference in arrival time between effective Tx beam signals selected from the received Tx beam signals. The transmitter 1740 transmits feedback information including the indication information to the base station.

The feedback information may further include information about the effective Tx beam signals and channel quality information associated with the effective Tx beam signals. The plurality of Tx beam signals may be reference channel signals. The effective Tx beam signals may be a predetermined number of selected Tx beam signals having high received signal quality among the received Tx beam signals.

According to an embodiment, the controller 1710 sequentially arranges the selected effective Tx beam signals, groups effective Tx beam signals in which a difference in arrival time between adjacent Tx beam signals is smaller than a preset threshold value among the sequentially arranged effective Tx beam signals, and generates the indication information indicating whether each of the selected effective Tx beam signals is included in the grouped effective Tx beam signals. The threshold value may be a value determined based on the length of a cyclic prefix (CP).

According to another embodiment, the calculation unit 1712 of the controller 1710 calculates a relationship of a difference in arrival time between the selected effective Tx beam signals. The relationship may indicates whether the difference in arrival time between the selected effective Tx beam signals is larger than or smaller than the preset threshold value. The information generation unit 1714 generates the indication information based on the calculated relationship. The threshold value may be a value determined based on the length of a cyclic prefix (CP). The indication information may be information of bits, the number of which is equal to one less than the number of the selected effective Tx beam signals.

According to another embodiment, the calculation unit 1712 of the controller 1710 determines one reference effective transmission signals of the selected effective Tx beam signals and calculates a difference in arrival time between the reference effective Tx beam signal and each of the other effective Tx beam signals. The information generation unit 1714 generates indication information indicating a difference in arrival time calculated with respect to each of the other effective Tx beam signals. The reference effective Tx beam signal may be an effective Tx beam signal having the most excellent received signal quality of the selected effective Tx beam signals. The reference effective Tx beam signal may be an effective Tx beam signal received at an earliest time point of the selected effective Tx beam signals.

According to the embodiments of the present disclosure, a receiver apparatus (a mobile station) provides information about a time difference between reception delay times dependent on beam paths to a transmitter apparatus (a base station) as feedback information. The transmitter apparatus which has received the feedback information may know Tx beams in which a time difference in delay time between signals through different paths is large and excludes the Tx beams in which a time difference in delay time between signals through different paths during scheduling operation, such as hybrid beamforming and beam switching, thereby improving performance during hybrid beamforming and beam switching unlike a case of using the Tx beams.

While the disclosure has been shown and described with reference to certain exemplary embodiments thereof, it will be understood by those skilled in the art that various changes in form and details may be made therein without departing from the spirit and scope of the disclosure as defined by the appended claims. A program command for performing operation implemented by various computers according to the embodiments of the present disclosure may be recorded in a computer-readable recording medium. The computer-readable recording medium may include program commands, data files, and data structures in singularity or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording mediums such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. When all or some of a base station or a relay described in the present disclosure is implemented by a computer program, a computer-readable recording medium storing the computer program is also included in the present disclosure. Therefore, the scope of the disclosure is defined not by the detailed description of the disclosure but by the appended claims, and all differences within the scope will be construed as being included in the present disclosure.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating a mobile station in a mobile communication system, the method comprising:
   determining, among a plurality of beams received from a base station, at least two beams based on a receive power of a reference signal received via each of the plurality of beams;
   generating indication information comprising a difference value between arrival time of the at least two beams; and
   transmitting, to the base station, the indication information.

2. The method of claim 1, further comprising transmitting feedback information including channel quality information for the at least two beams.

3. The method of claim 1, wherein determining the at least two beams comprises determining at least two beams based on whether the receive power of the reference signal received via each of the plurality of beams is greater than a predetermined value.

4. The method of claim 1, further comprising:
sequentially arranging the plurality of beams; and
determining a plurality of adjacent beams among the sequentially arranged plurality of beams, wherein a difference value between arrival time of the plurality of adjacent beams is less than a preset threshold value,
wherein the indication information further comprises data indicating whether each of the plurality of adjacent beams is included in the at least two beams.

5. The method of claim 1, wherein generating the indication information comprises:
calculating data associated with the difference value; and
generating the indication information based on the calculated data.

6. The method of claim 5, wherein the data indicates whether the difference value is larger than a preset threshold value.

7. The method of claim 5, wherein the indication information includes information of bits, a number of which is one less than a number of the at least two beams.

8. The method of claim 1, wherein generating the indication information comprises:
determining one beam among the at least two beams;
calculating a difference value between arrival time of the one beam and other beams of the at least two beams; and
generating the indication information indicating a difference value with respect to arrival time for each of the other beams of the at least two beams.

9. The method of claim 8, wherein determining one beam among the at least two beams comprises determining one beam having a best receive power of a reference signal or being received at an earliest time point among the plurality of beams.

10. A method for operating a base station in a mobile communication system, the method comprising:
transmitting, to a mobile station, a plurality of beam; and
receiving, from the mobile station, indication information for indicating a difference value between arrival time of at least two beams among the plurality of beams,
wherein the at least two beams are determined based on a receive power of a reference signal transmitted via each of the plurality of beams to the mobile station.

11. The method of claim 10, further comprising transmitting wherein the feedback information including channel quality information for the at least two beams.

12. The method of claim 10, wherein the at least two beams are determined based on whether the receive power of the reference signal transmitted via each of the plurality of beams is greater than a predetermined value.

13. The method of claim 10, wherein:
the indication information further comprises data indicating whether each of a plurality of adjacent beams is included in the at least two beams, and
the plurality of adjacent beams are determined among the plurality of beams arranged sequentially, wherein a difference value between arrival time of the plurality of adjacent beams is less than a preset threshold value.

14. The method of claim 10, wherein the indication information includes information generated based on data associated with the difference value.

15. The method of claim 14, wherein the data indicates whether the difference value is larger than a preset threshold value.

16. The method of claim 14, wherein the indication information includes information of bits, a number of which is one less than a number of the at least two beams.

17. The method of claim 10, wherein the indication information includes information indicating a difference value between arrival time of one beam and each of other beams among the at least two beams.

18. The method of claim 17, wherein the one beam among the at least two beams comprises a best receive power of a reference signal or be transmitted at an earliest time point among the plurality of beams.

19. An apparatus for a mobile station in a mobile communication system, the apparatus comprising:
at least one processor configured to:
determine, among a plurality of beams received from a base station, at least two beams based on a receive power of a reference signal received via each of the plurality of beams;
generate indication information for indicating a difference value between arrival time of the at least two beams; and
at least one transceiver configured to transmit, to the base station, the indication information.

20. The apparatus of claim 19, wherein the at least one transceiver further configured to transmit feedback information including channel quality information for the at least two beams.

21. The apparatus of claim 19, wherein the at least two beams are determined based on whether the receive power of the reference signal received via each of the plurality of beams is greater than a predetermined value.

22. The apparatus of claim 19, wherein the at least one processor is configured to:
sequentially arrange the plurality of beams; and
determine a plurality of adjacent beams among the sequentially arranged the plurality of beams, wherein a difference value between arrival time of the plurality of adjacent beams is less than a preset threshold value,
wherein the indication information further comprises data indicating whether each of the plurality of adjacent beams is included in the at least two beams.

23. The apparatus of claim 19, wherein the at least one processor is configured to:
calculate data associated with the difference value; and
generate the indication information based on the calculated data.

24. The apparatus of claim 23, wherein the data indicates whether the difference value is larger than a preset threshold value.

25. The apparatus of claim 23, wherein the indication information includes information of bits, a number of which is one less than a number of the at least two beams.

26. The apparatus of claim 19, wherein the at least one processor is configured to:
determine one beam among the at least two beams;
calculate a difference value between arrival time of the one beam and other beams of the at least two beams; and
generate the indication information indicating a difference value with respect to arrival time for each of the other beams of the at least two beams.

27. The apparatus of claim 26, wherein the one beam among the at least two beams comprises a best receive power of a reference signal or being received at an earliest time point among the plurality of beams.

28. An apparatus for a base station in a mobile communication system, the apparatus comprising:
at least one processor operatively coupled to at least one transceiver; and
the at least one transceiver configured to:
transmit, to a mobile station, a plurality of beams; and
receive, from the mobile station, indication information for indicating a difference value between arrival time of at least two beams among the plurality of beams,
wherein the at least two beams are determined based on a receive power of a reference signal transmitted via each of the plurality of beams to the mobile station.

29. The apparatus of claim 28, wherein the at least one transceiver is further configured to transmit feedback information including channel quality information for the at least two beams.

30. The apparatus of claim 28, wherein the at least two beams are determined based on whether the receive power of the reference signal transmitted via each of the plurality of beams is greater than a predetermined value.

31. The apparatus of claim 28, wherein:
the indication information further comprises data indicating whether each of a plurality of adjacent beams is included in the at least two beams, and
the plurality of adjacent beams are determined among the plurality of beams arranged sequentially, wherein a difference value between arrival time of the plurality of adjacent beams is less than a preset threshold value.

32. The apparatus of claim 28, wherein the indication information includes information generated based on data associated with the difference value.

33. The apparatus of claim 32, wherein the data indicates whether the difference value is larger than a preset threshold value.

34. The apparatus of claim 32, wherein the indication information includes information of bits, a number of which is one less than a number of the at least two beams.

35. The apparatus of claim 34, wherein the indication information includes information indicating a difference value between arrival time of one beam and each of other beams among the at least two beams.

36. The apparatus of claim 35, wherein the beam among the at least two beams comprises a best receive power of a reference signal or be transmitted at an earliest time point among the plurality of beams.

* * * * *